United States Patent [19]

Pone et al.

[11] 4,264,194
[45] Apr. 28, 1981

[54] PHOTOGRAPHIC REPRINT SYSTEM WITH REPRINT NEGHOLD INDICATION

[75] Inventors: Janis Pone, Minneapolis; Ronald C. Laska, Minnetonka, both of Minn.

[73] Assignee: Pako Corporation, Minneapolis, Minn.

[21] Appl. No.: 109,822

[22] Filed: Jan. 7, 1980

Related U.S. Application Data

[63] Continuation-in-part of Ser. No. 23,521, Mar. 23, 1979, abandoned.

[51] Int. Cl.$^3$ .................. G03B 27/72; G03B 27/76
[52] U.S. Cl. .................................. 355/35; 355/64; 355/68; 355/74
[58] Field of Search .................. 355/32, 35, 38, 64, 355/68, 54, 74

[56] References Cited

U.S. PATENT DOCUMENTS

| | | | |
|---|---|---|---|
| 3,447,871 | 1/1969 | Neale | 355/18 |
| 3,689,149 | 9/1972 | Livingood | 355/54 X |
| 3,888,580 | 6/1975 | Amano et al. | 355/38 |
| 3,937,573 | 2/1976 | Rising | 355/35 X |
| 3,947,110 | 3/1976 | Yamada | 355/38 |
| 4,039,258 | 8/1977 | Hujer et al. | 355/38 X |
| 4,128,330 | 12/1978 | Fergg | 355/32 |
| 4,150,894 | 4/1979 | Meyer et al. | 355/38 |
| 4,152,068 | 5/1979 | Bickl et al. | 355/68 X |
| 4,204,733 | 5/1980 | Modney et al. | 355/64 |
| 4,214,834 | 7/1980 | Findeis et al. | 355/38 X |

*Primary Examiner*—Richard A. Wintercorn
*Attorney, Agent, or Firm*—Kinney, Lange, Braddock, Westman and Fairbairn

[57] ABSTRACT

A photographic printer has a first set of negholds for use with first-run production printing, and a second set of negholds for use with reprint production printing from film segments attached to an elongated paper tab. The first set of negholds includes one neghold for each of the commonly used sizes of photographic film, such as 110, 126 and 135. Similarly, the second set of negholds includes a neghold for each of these same common film sizes. Circuitry associated with the neghold indicate to the printer control whether a first-run neghold or a reprint neghold is being used. The photographic printer has stored a first set of calibration values for use with the first set of negholds and a second set of calibration values for use with the second set of negholds. Based upon the indication from the circuitry associated with the negholds, the photographic printer automatically selects which set of calibration values are to be used. Selection of the particular calibration values from either the first or second set of values is determined by the color balance setup.

10 Claims, 5 Drawing Figures

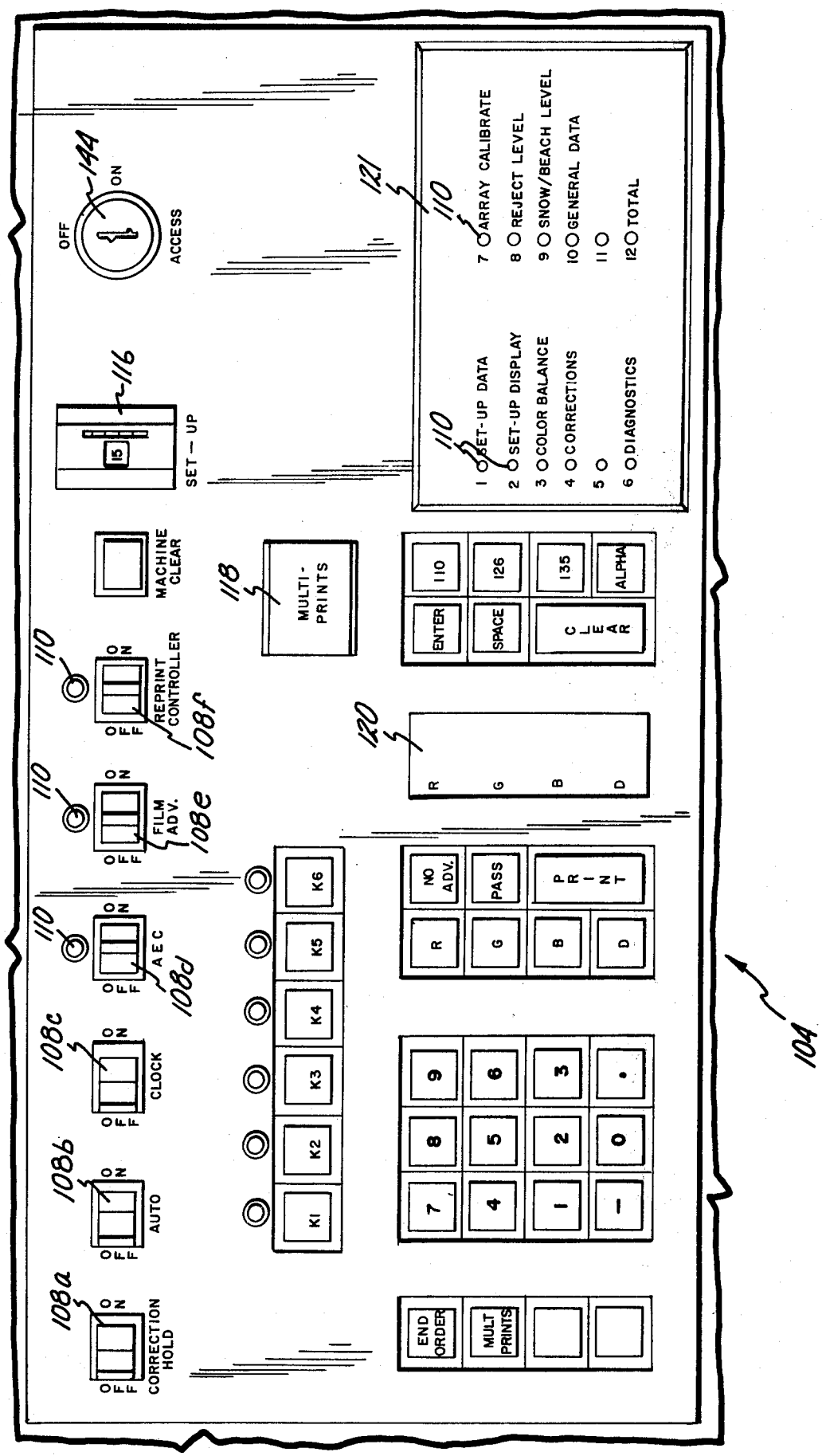

PHOTOGRAPHIC REPRINT SYSTEM WITH REPRINT NEGHOLD INDICATION

REFERENCE TO CO-PENDING APPLICATION

The present application is a continuation-in-part of U.S. patent application Ser. No. 23,521, now abandoned filed Mar. 23, 1979 by Ronald B. Harvey, Janis Pone, Ronald C. Laska, and Francis M. Laciak, which is assigned to the same assignee as the present application.

Reference is also made to the following U.S. patent applications, all of which are assigned to the same assignee as the present application, are filed on even date with this application, and are continuations-in-part of the above-mentioned application Ser. No. 23,521 now abandoned: Ser. No. 109,823, entitled "Photographic Reprint System with Dual Indicia Sensor for Synchronization Recovery"; Ser. No. 109,825, entitled "Photographic Reprint System with Information Display"; Ser. No. 109,821, entitled "Photographic Reprint System with Large Print Quantity Verification"; and Ser. No. 109,824, entitled "Photographic Reprint System with Film Size Code Comparison".

BACKGROUND OF THE INVENTION

1. Field of the Invention

The present invention relates to photographic printing systems. In particular, the present invention is a photographic printer which is capable of operation in either a first-run production mode or a reprint production mode.

2. Description of the Prior Art

In commercial photographic processing operations, very high rates of processing must be achieved and maintained in order to operate profitably. In order to permit efficient automatic processing, orders containing films of similar type and size are typically spliced together for developing. As many as 500 to 1,000 rolls of twelve, twenty, twenty-four, and thirty-six exposure film of the same type and size may be spliced together for processing and printing purposes.

After developing, the photographic images contained in the film originals (generally negatives) are printed in an edge-to-edge relationship on a continuous strip of photosensitive paper by a photographic printer. The photographic printer causes high intensity light to be passed through the negative and imaged on the photographic print paper to expose the photographic emulsion layers of the paper. The print paper is subsequently processed to produce a print of the image contained in the negative.

This type of large-scale production is well suited to original or first-run production of photographic prints in which the film may be spliced to form a continuous roll. In the past, however, it has not been particularly well suited to production of reprints, where the customer has already received prints and has decided that he wishes to have additional prints made of certain negatives. Unlike first-run production, making of reprints has typically not been highly automated.

There are several reasons why reprints require special, less efficient handling. First, when reprints are ordered, the negatives generally have already been cut into short segments of three or four frames each, which are more difficult to handle than the longer film strips encountered in first-run production printing. Second, the customer may only desire reprints from one frame of a particular segment. This is unlike first-run production, in which a print is typically made from every printable negative on the strip. Third, often multiple prints rather than just a single print are desired from one or more negatives on a segment. Fourth, no extra non-printing area on the film is normally available to which a splice may be made. Fifth, reprints are requested from a much wider variety of film types than are typically encountered in first-run production. Sixth, color and/or density corrections may be required to produce a satisfactory print.

Because of these problems, making of reprints has often been handled on a manual or semi-automatic basis, and often on a different printer from the high speed first-run production printers, on which it may be impossible to reproduce identical print color balance and density corrections. Also dust and dirt from handling the negatives on a manual basis can degrade print quality. As a result, the quality of reprints often differs from first-run production prints. The lower quality of reprints in comparison to first-run production prints is a source of customer dissatisfaction.

In order to overcome of the problems of making reprints, and to provide more efficient automated printing of reprints, systems have been developed in which the individual segments of negatives from which reprints are to be made are temporarily attached to a long paper strip or "tab". The "tabbing" of negatives to be reprinted is performed at a "preparation" or "order entry" station, where indica (typically in the form of punched holes) are formed in the tab adjacent the frames of the negatives. These holes are used as frame location indicators and also provide frame status information. For example, in one system the number of holes may vary from one to four, with the first hole always indicating the frame location, while multiple holes provide the frame status information to allow the printer system to maintain synchronization of reprint data with the tabbed film material. In this system, two holes at a frame signify the end of a film strip, three holes at a frame signify the end of a customer order, and four holes at a frame indicate the end of a reel. In this type of system, a data entry device and a data storage device at the preparation station are used by the operator to store for each frame the number of holes in the tab, print quantity, density/color corrections, and setup number.

In a typical automated reprint system, a photographic printer includes sensors for sensing the indicia on the paper tab in order to sense the location of each frame to be printed. The data stored in the memory device for that particular frame is transferred to the photographic printer, and the required number of reprints, if any, from that frame are then produced.

SUMMARY OF THE INVENTION

The present invention is a photographic printer which may be used for producing both first-run production prints and for producing reprints from tabbed film segments. The photographic printer has a first set of negholds for use in first-run production printing and a second set of negholds for use with reprint production printing. The photographic printer stores calibration values for each film size for the first set of negholds and calibration values for each of the same film sizes for the second set of negholds. Circuitry associated with the neghold indicates to the photographic printer whether the particular neghold mounted in the printer is one of the first set or of the second set of negholds, and the photographic printer selects the appropriate calibration value based upon this indication.

The present invention also preferably includes a device for sequentially retrieving stored information to be used in controlling printing of photographic reprints. When the circuitry associated with the neghold indicates that a neghold from the first set is being used, the printer will not accept data from the retrieval device. On the other hand, when a neghold from the second set is indicated as being in use, data from the retrieval device may be accepted depending upon whether a first or a second reprint mode has been selected.

When operating in the first reprint mode, the printer requests and accepts data from the retrieval device, and automatically advances the tabbed film. The print quantities, color/density button corrections, and color balance setup to be used are derived from the data supplied from the device.

When in the second reprint mode, the printer does not accept information from the retrieval device. The operator manually provides color/density button corrections, print quantity, setup selection, and actuation of each print cycle. The second reprint mode is particularly useful in resynchronizing the reprint system after a loss of synchronization between the printer and the retrieval device, and for altering print quantities or button corrections erroneously provided by the retrieval device.

BRIEF DESCRIPTION OF THE DRAWINGS

FIG. 4 is a view of the operator control panel of the photographic printer of FIG. 2.

DETAILED DESCRIPTION OF THE PREFERRED EMBODIMENTS

Figure 1:
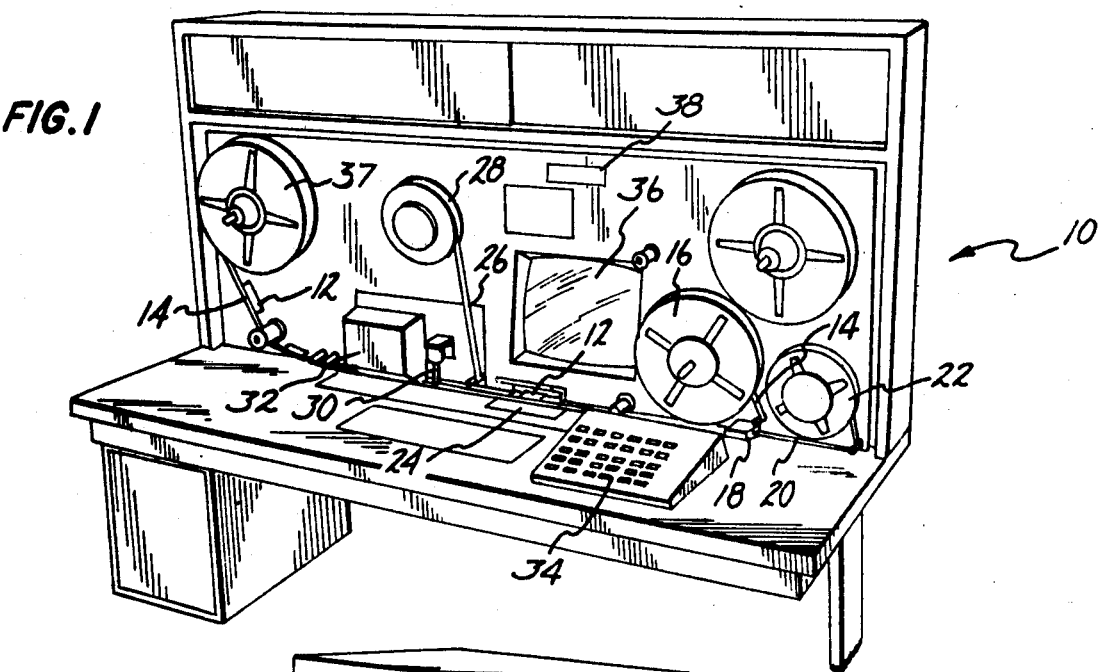
FIG. 1 is a perspective view of a reprint film preparation station, at which strips or segments of films are attached to a paper tab, and at which data is stored relating to each frame.

FIG. 1 shows reprint film preparation station 10, at which segments or strips of photographic film 12 are attached to a paper strip or tab 14. As shown in FIG. 1, paper tab 14 is fed from reel 16 and under roller 18, where first transparent adhesive tape 20 is attached to the underside of tab 16. First tape 20 is supplied from reel 22, as shown in FIG. 1. The one edge of first tape 20 is exposed, and is used for attaching film segments 12 to paper tab 14 at mounting station 24. After film segments 12 are attached at mounting station 24, second transparent adhesive tape strip 26, which is fed from reel 28, is applied to the top surface of the junction between film segment 12 and paper tab 14. The use of first and second transparent tape strips 20 and 26 at top and bottom provides a more secure fastening of film segment 12 to paper tab 14.

After film segment 12 has been attached to paper tab 14, it advances to a marking station, at which punch holes are produced by paper punch 30. These holes are punched in paper tab 14 and indicate both the frame location and frame status information. A single hole punched in paper tab 14 indicates the location of a frame. Two holes at a frame signify both frame location and the end of a film segment. Three holes indicate a frame location, the end of a film segment, and the end of an order. Four holes indicate the location of a frame, the end of a film segment, the end of an order, and the end of the reel. Paper tab 14 and film segment 12 then advance to a paper printer 32, which prints human readable information on paper tab 14 adjacent the strip or a particular frame. In particular, paper printer 32 prints the order number adjacent the end of each order, the desired print quantity for each frame adjacent that frame, the total number of prints in each order at the end of each order, and other useful management information at the end and beginning of a reel.

Control of the operation of paper punch 30 and paper printer 32 is provided through data entry console 34. The operator of the preparation station enters, through console 34, information which is needed in the printing of prints from each frame. This information includes the end of strip, order, or reel information which determines the number of holes which should be sensed in tab 14 adjacent the frame, print quantity for that frame, and density/color correction for that frame, and the color balance setup to be used in printing reprints from that frame. The information entered through console 34 is displayed on data display 36 and is stored on a memory medium, such as a floppy disk, in controller/disk drive 38.

As shown in FIG. 1, tab 14 with attached film segments 12 is wound onto take-up reel 37. Prior to printing, tab 14 and segments 12 preferably are rewound onto a supply reel of a printer.

Figure 2:
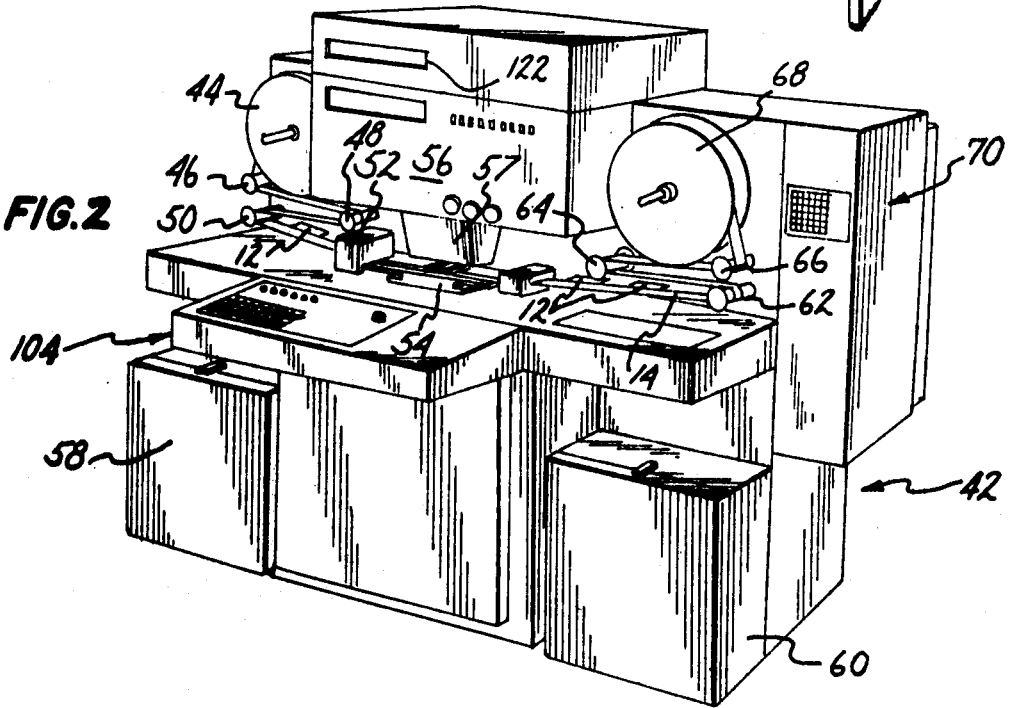
FIG. 2 is a perspective view of a photographic printer of the present invention for providing either first-run production or reprint production.

FIG. 2 shows a photographic printer 42 which utilizes the present invention in producing both reprints and first-run production prints. In FIG. 3, printer 42 is shown in a reprint production mode. Film segments 12 and paper tab 14 are supplied from supply reel 44 over stationary roller 46, bale arm 48, and stationary roller 50 to a film cleaning station 52, where the film segments 12 are cleaned prior to printing. Film segments 12 and paper tab 14 then advance to the neghold assembly 54, at which time the frames are initially previewed by light sensors to determine whether automatic exposure corrections are necessary, and then are advanced to a print gate, where light from lamp house 56 and drop cone assembly 57 is passed downward through the negative to expose photosensitive print paper (not shown) located within printer 42. In FIG. 3, print paper is fed from a light-tight supply magazine 58, into printer 42 and onto a paper deck (not shown). After exposure, the print paper is fed out of printer 42 into light-tight takeup magazine 60. After the film segments 12 and paper tab 14 have passed the neghold station 54, they are advanced over stationary roller 62 and bale arm 64 and stationary roller 66 to takeup reel 68.

In the preferred embodiment of the present invention shown in FIG. 2, floppy disk drive/controller 70 is attached to printer 42. Floppy disk drive/controller 70 is a data retrieval device which sequentially reads data from the floppy disk produced at preparation station 10 during the initial tabbing of the film.

Figure 3A:
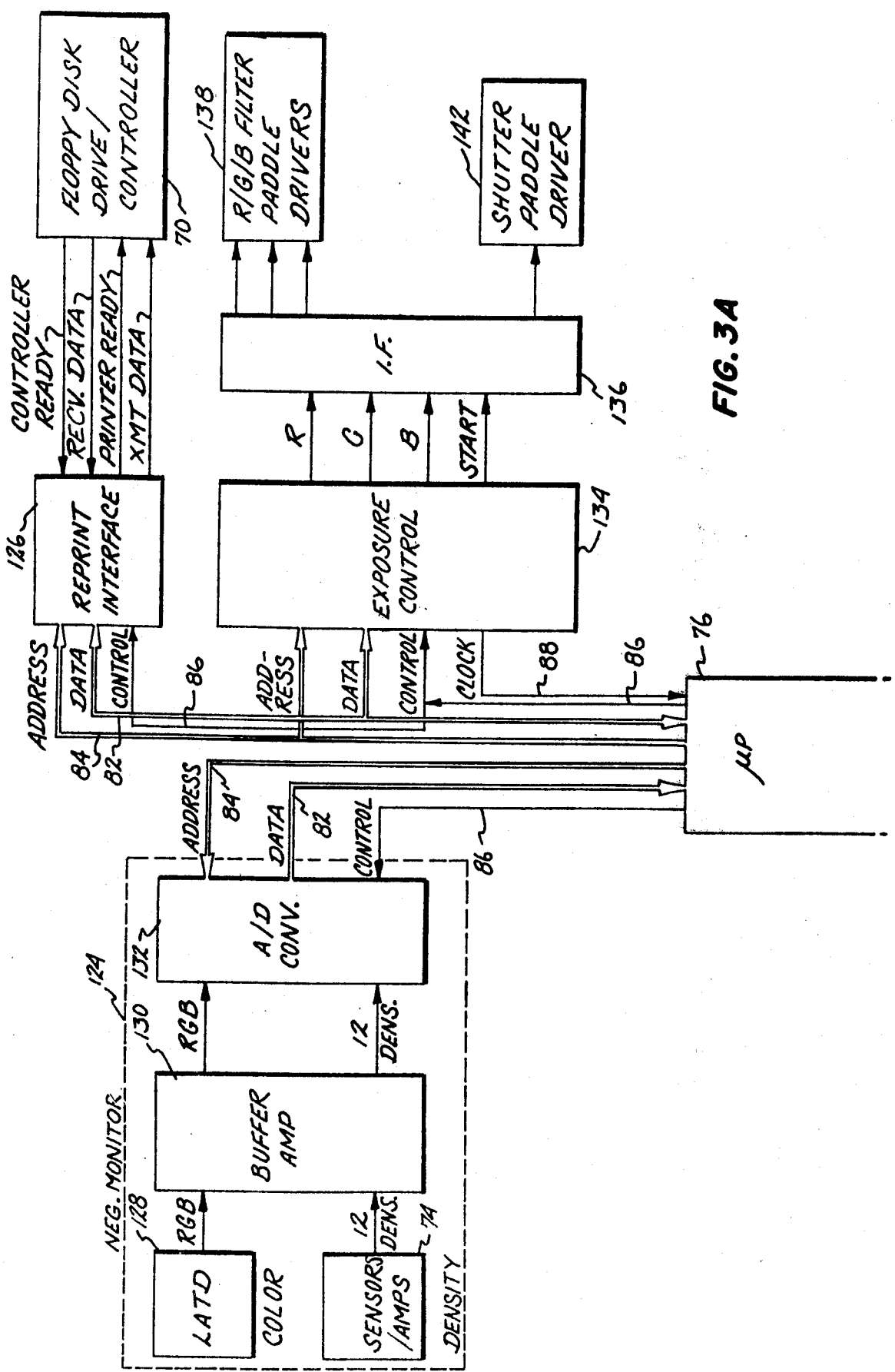
FIGS. 3A and 3B are an electrical block diagram of the photographic printer of FIG. 2.
Figure 3B:
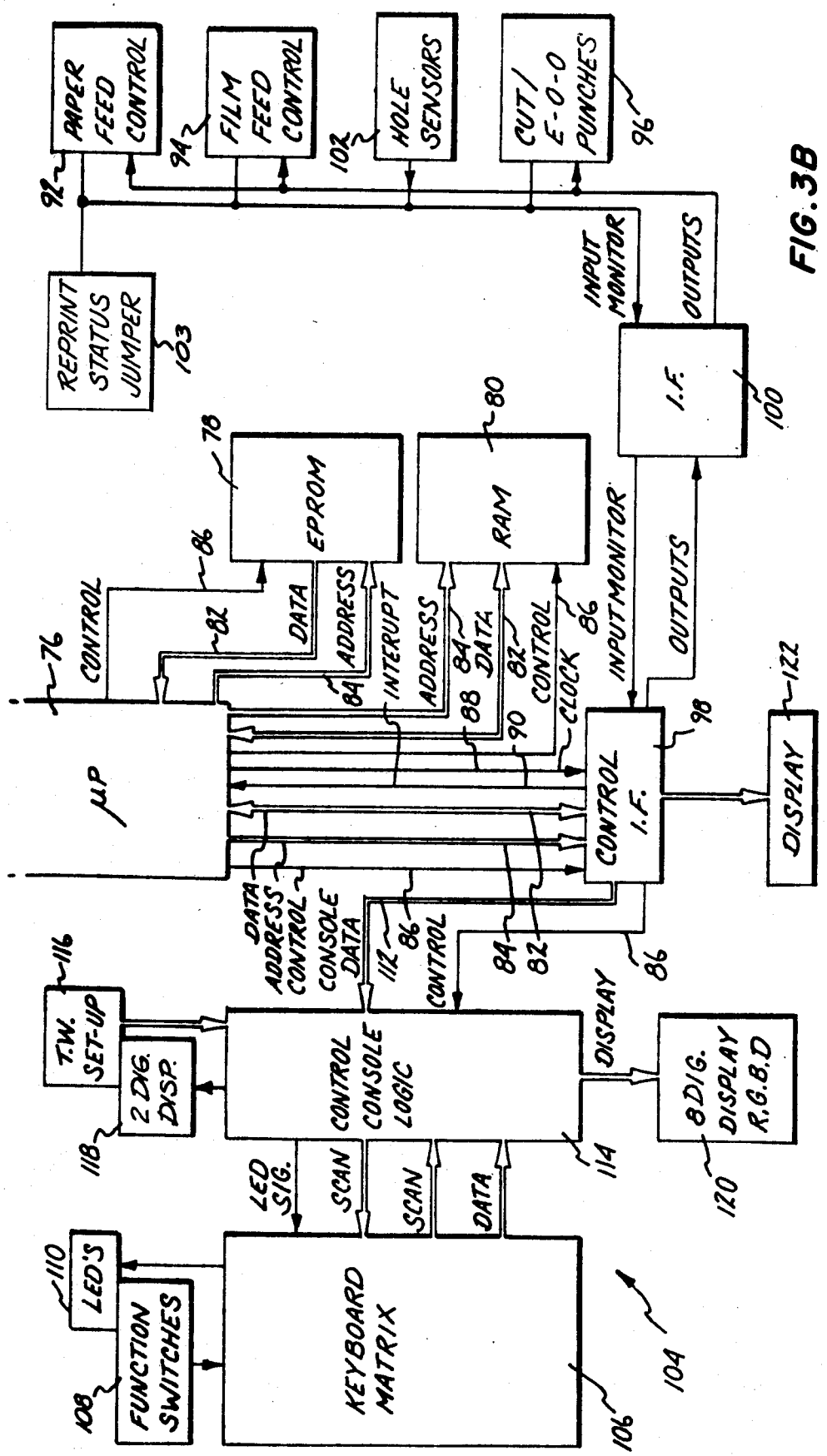

FIGS. 3A and 3B show an electrical block diagram of printer 42 shown in FIG. 3. Coordinating and controlling the operation of printer 42 is microprocessor 76, which in one preferred embodiment is an eight-bit microprocessor such as an Intel 8080A. Associated with microprocessor 76 are erasable programmable read only memory (EPROM) 78 and random access memory (RAM) 80. Microprocessor 76 communicates with the various portions of the control system through data bus 82, address bus 84, control bus 86, clock line 88, and interrupt lines 90.

In the embodiment shown in FIGS. 3A and 3B, microprocessor 76 directly controls the exposure control functions of the printer. In addition, microprocessor 76 coordinates the operation of paper feed control 92, film feed control 94, and cut/end-of-order punches 96 through control interface 98 and interface circuit 100. Input monitor signals are supplied to microprocessor 76, and output control signals are supplied to paper feed control 92, film feed control 94, and cut/end-of-order punches 96.

In the embodiments shown in FIGS. 3A and 3B, hole sensors 102a and 102b, which sense the punched holes in paper tab 14 at the preview and print gates, respectively, supply signals to microprocessor 76 through interface circuit 100, and control interface 98.

In addition, microprocessor 76 receives a neghold status indication from neghold status jumper 103. In the preferred embodiments of the invention, the neghold status jumper is carried on the lower portion of each neghold and indicates whether the neghold is a first-run production neghold or a reprint production neghold. The status of the signal received from neghold status jumper 103 indicates to microprocessor 76 whether or not reprint operation is allowed. In one preferred embodiment, the reprint status jumper 103 is an open circuit on the first-run neghold and is a short-circuit jumper on the reprint neghold. Microprocessor 76 monitors the neghold status jumper through the input monitor lines supplied through interface 100 and control interface 98.

Microprocessor 76 receives control information entered by the operator of printer 42 through control panel or console 104 (shown in FIG. 4). Console 104 includes a keyboard 106 through which the operator can enter a wide variety of alpha-numerical control information. Among the control information which is entered through keyboard 106 is red, green, blue and overall density button corrections entered by the operator. In preferred embodiments, color balance setup parameters, slope, gamma factors, and other exposure control parameters are also entered through keyboard matrix 106. As shown in FIG. 3A, function switches 108 are monitored by microprocessor 76 through keyboard matrix 106. Light-emitting diodes 110 are associated with function switches 108 and keyboard matrix 106, and depending upon which function or functions are selected, microprocessor 76 energizes the appropriate light-emitting diode or diodes.

Microprocessor 76 communicates with console 104 through control interface 98. Console data lines 112 and control lines 86 interconnect control interface 98 with control console logic 114. Signals to and from keyboard 106 are routed through control console logic 114. In addition to keyboard 106, control console logic 114 also is connected to setup select thumbwheel switches 116, two-digit print quantity display 118, and eight-digit color/density correction display 120. Thumbwheel switches 116 are used both in the initial storage of color balance setup data in random access memory 80, and also during normal first-run production printing to select the setup. During automatic reprint operation, the selection of setup is provided by data stored on a floppy disk which is read by floppy disk drive/controller 70.

FIG. 4 shows a preferred embodiment of control panel or console 104. Keyboard matrix 106, shown in FIG. 3A, includes the following keys which are shown in FIG. 4: "END-OF-ORDER", "MULT PRINTS", "0" through "9", "—", ".", "R", "G", "B", "D", "NO ADV" (no advance), "PASS", "PRINT", "ENTER", "SPACE", "CLEAR", "110", "126", "135", "ALPHA", "K1" through "K6", and "MACHINE CLEAR". Control console 104 also includes several function switches, including CORRECTION HOLD switch 108a, AUTO switch 108b, CLOCK switch 108c, AEC (automatic exposure correction) switch 108d, FILM ADVANCE switch 108e, and REPRINT CONTROLLER switch 108f, key-operated ACCESS switch 108g. SETUP thumbwheel switch 116, multiple print two-digit print quantity display 118, and eight-digit correction display 120 are also included on console 104. Key-operated ACCESS switch 108g, limits access to certain functions of the machine so that only the lab manager or another authorized person may alter certain critical operating parameters of the printer. Operation of ACCESS switch 108g is described in further detail in a copending patent application Ser. No. 867,897 by J. Pone, filed Jan. 9, 1978, and assigned to the same assignee as the present application.

Light-emitting diodes 110 are located adjacent AEC switch 108d, FILM ADVANCE switch 108e, and REPRINT CONTROLLER switch 108f to indicate when the functions actuated by these switches are ON. Additional light-emitting diodes 110 are located below a transparent function code plate 121 which has printed thereon the names of various functions or operating modes of the printer. Depending upon which function is selected, the light-emitting diode 110 adjacent that function is energized, and shines through transparent plate 121.

Two-digit print quantity display 118 displays the number of prints to be made when the film frame is in the print gate. Each time an exposure cycle occurs, the print quantity being displayed is decremented until the desired print quantity has been made and the number displayed reaches zero.

Eight-digit display 120 displays the selected button corrections for red, green, blue and overall density. These button corrections either have been entered through keyboard 106 (in the case of manual operation independent of controller 70), or are the corrections retrieved by controller 70 from the floppy disk and supplied to microprocessor 76. In either case, microprocessor 76 provides the appropriate drive signals to display 120 through control interface 98 and control console logic 114. The corrections displayed on display 120 are for the frame then in the print gate.

In the embodiment shown in FIG. 3A, microprocessor 76 also controls display 122 through control interface 98. Display 122, which is also shown in FIG. 2, displays a wide variety of information of importance to the operator. For example, during initial color balancing display 122 displays instructions of the steps to be performed by the operator. In another mode, display 122 preferably displays current information as to stored parameters, and automatic corrections being used. During normal operation, in either the first run or reprint mode, display 122 displays setup number and name, or print exposure times, or error messages.

Microprocessor 76 controls print exposures based upon stored data contained in EPROM 78, RAM 80, data received from control console logic 114, and sensor signals received from negative monitor circuit 124 (FIG. 3B). In addition, when the printer is in the reprint mode of operation, additional data is received from floppy disk controller 70 through reprint interface circuit 126.

As shown in FIG. 3B, negative monitor circuitry 124 includes the density sensors 74, which provide measurement of density at a plurality of individual locations on the print. The signals from sensors 74 are produced when the negative is at the preview gate.

Negative monitor circuit 124 also includes large area transmission density (LATD) sensors 128, which provide red, green and blue LATD signals indicating the overall color content of the negative. LATD sensors 128 are located within the printer below the print gate.

Both the density signals from sensors 74 and the LATD signals from LATD sensors 128 are supplied to buffer amplifier circuit 130.

The LATD signals and the density signals are provided by buffer amplifier circuitry 130 to analog-to-digital converter 132. In a preferred embodiment, analog-to-digital converter 132 also includes multiplexers for multiplexing the twelve density sensor signals and multiplexing the three LATD signals. The signals are converted to digital signals, and are provided to microprocessor 76 over data bus 82.

Based upon the data which it receives, microprocessor 76 supplies data to exposure control 134. In one preferred embodiment, exposure control 134 is similar to the exposure control circuit shown in U.S. Pat. No. 4,140,391 by Laciak and Pone, which is assigned to the same assignee as the present application. Exposure control 134 supplies red, green and blue exposure time control signals through interface circuit 136 to red, green and blue filter paddle drivers 138. In addition, exposure control 134 supplies a start signal through interface circuit 136 to shutter paddle driver 142.

The photographic printer of the present invention controls printing in either the first-run or reprint production modes based upon color balance setup data stored in random access memory 80. Typically there are a plurality of different color balance setups stored in RAM 80 for different film size/film type combinations. In one preferred embodiment of the present invention, the color balance setup data stored in RAM 80 includes the following information: a film size code; the message to be displayed on alpha-numerical display 122; red, green and blue aim points; gamma factors; slope centers; over/under slope values; color balance factors; density and color button increment; temporary color/density corrections; over/under reject levels; snow/bleach scene (SNRA) value; and totals of average print times, total prints and number of film sync errors. Some of this setup data is described in further detail in the following patents and patent applications, all of which are assigned to the same assignee as the present application: U.S. Pat. Nos. 4,149,799 by J. Pone and P. Seidel; 4,168,120 and 4,168,121 by J. Freier, R. Harvey and J. Pone; Ser. No. 848,739 by J. Pone, filed Nov. 4, 1977; Ser. No. 848,738 by J. Pone, filed Nov. 4, 1977; and Ser. No. 867,897 by J. Pone filed Jan. 9, 1978.

It should be understood, of course, that other information may be included within the color balance setup data stored. It should also be understood that in different photographic systems, not all of the information described above is stored as part of the color balance setup data. In most printers, however, the color balance setup includes at least some of the information listed above, or similar information used in controlling red, green and blue exposures for a particular film size and type.

In the preferred embodiments of the present invention, RAM 80 also stores array calibration data for each film size. This calibration data preferably includes the information described in U.S. Pat. No. 4,176,659, by R. Laska, issued on Oct. 30, 1979, and assigned to the same assignee as the present application.

In the preferred embodiment of the present invention, the first set of negholds includes a first-run neghold for each of the three common film sizes (110, 126 and 135). The array calibration data includes data for each of these three negholds of the first set. Similarly, the second set of negholds includes a reprint neghold for each of the same three film sizes, and the calibration data includes data for these negholds. In other words, a total of six different sets of array calibration data is stored.

When operation of the photographic printer is initiated, microprocessor 76 interrogates neghold status jumper 103 to determine whether a first-run production neghold or a reprint production neghold is being used. In the event that the neghold is a first-run production neghold, microprocessor 76 selects the appropriate calibration data depending upon the film size code stored in the selected color balance setup. Microprocessor 76 determines which color balance setup has been selected by interrogating setup select switch 116. In the first-run production mode, microprocessor 76 will not accept data from reprint controller 70.

If microprocessor 76 determines from neghold status jumper 103 that a reprint neghold is being used, then the printer is controlled in one of several reprint production modes rather than a first-run production mode. In the reprint production, one of the three sets of calibration data stored in RAM 80 for reprint negholds is used. The particular set of data to be used depends upon the film size code in the selected setup.

In the preferred embodiments of the present invention, when a reprint neghold is in place the printer is capable of operation in four different modes: "Automatic Reprint", "Timing", "Manual Reprint—Data from Disk", and "Manual Reprint—Data from Control Console". Selection of the particular mode is based upon the states of AUTO switch 108b and REPRINT CONTROLLER switch 108f.

In the "Automatic Reprint" mode, AUTO switch 108b and REPRINT CONTROLLER switch 108f are both ON. Information is sequentially retrieved from the floppy disk and supplied by controller 70 to microprocessor 76 through reprint interface 126. This data is supplied to microprocessor 76 only upon request by microprocessor 76. The information received from controller 70 includes the number of holes which should be sensed for the particular frame, the print quantity desired, density and color correction data, the setup number for the frame to be printed, and a film size code for error checking purposes. The selection of setup, therefore, is determined by the data from the floppy disk.

The "Timing" mode is selected when the AUTO switch 108b is ON and REPRINT CONTROLLER switch 108f is OFF. In addition, FILM ADVANCE switch 108e must also be OFF and the light emitting diode 110 above FILM ADVANCE switch 108e unlit. In the "Timing" mode, the printer cycles continuously on a negative located in the printing gate. Manual buttoning is permitted. The setup used is designated by the thumbwheel setup switch 116.

The "Manual Reprint—Data from Disk" mode is selected when AUTO switch 108b is OFF and REPRINT CONTROLLER switch 108f is ON. Data is still received from controller 70, but each film advance and print cycle must be initiated by the operator by depressing the PRINT key on keyboard 104. In this mode, neither button entries nor multiple print entries are possible from the keyboard, since all control information comes from controller 70. The first frame of each strip stops at the AEC gate until the PRINT key is depressed a second time, in order that the print quantity on the paper tab may be read by the operator.

The "Manual Reprint—Data from Control Console" mode is selected when both AUTO switch 108b and REPRINT CONTROLLER switch 108f are OFF. In this mode, the printer operates as a manual printer, but is capable of processing tabbed film so that correct framing occurs and the correct AEC data is applied. In this mode, data from reprint controller 70 is not accepted. Manual buttoning and operator entry of print quantities through keyboard 104 is permitted. The setup to be used is designated by thumbwheel setup switch 116.

In conclusion, the photographic printer of the present invention provides capability of operation for both first-run and reprint production. Operation in a first-run production mode using reprint negholds, or vice versa, is prevented by means of circuitry associated with the negholds which identifies the neghold as being either first-run or reprint. In addition, the proper calibration data is selected based upon the identification of the neghold.

Although the present invention has been described with reference to preferred embodiments, workers skilled in the art will recognize that changes may be made in form and detail without departing from the spirit and scope of the invention.

What is claimed is:

1. In a photographic printer used for both first-run production and reprint production printing of photographic prints, the improvement comprising:
    a first set of interchangeable negholds for different film sizes used in first-run production printing;
    a second set of interchangeable negholds for different film sizes used in reprint production printing; and
    means associated with the negholds for providing a neghold status signal indicative of whether the neghold being used with the photographic printer is from the first or the second set of interchangeable negholds.
2. The invention of claim 1 and further comprising:
means for storing calibration data for each neghold of the first and second sets; and
    means for selecting from the calibration data stored as a function of the neghold status signal.
3. The invention of claim 2 and further comprising:
    means for storing a plurality of color balance setups, each color balance setup including a film size code indicative of a film size with which the color balance setup is used.
4. The invention of claim 3 and further comprising:
    means for selecting one of the plurality of color balance setups; and
    wherein the means for selecting from the calibration data selects the calibration data as a function of the neghold status signal and the film size code stored in the selected color balance setup.
5. The invention of claim 1 and further comprising:
    means for storing, for each film to be printed in reprint production printing, information to be used in controlling the printing of the film;
    means for retrieving, prior to printing the film, the stored information; and
    means for selecting an Automatic Reprint mode in which the retrieved stored information is used in controlling printing, or a first Manual Reprint mode in which the stored information is not used in controlling printing.
6. The invention of claim 5 wherein the means for selecting comprises:
    first and second switch means; and
    means for selecting the mode as a function of the states of the first and second switch means, and the neghold status signal.
7. The invention of claim 6 wherein the means for selecting selects the Auto Reprint mode if the neghold status signal indicates that a neghold from the second set is being used, and the first and second switch means both are in a first state.
8. The invention of claim 6 or 7 wherein the means for selecting selects the first Manual Reprint mode if the neghold status signal indicates that a neghold of the second set is being used, and the first and second switch means both are in a second state.
9. The invention of claim 6 wherein the means for selecting selects a second Manual Reprint mode in which an operator initiates each print cycle and the retrieved stored information is used in controlling printing, if the neghold status indicates that a neghold of the second set is being used, the first switch means is in a second state, and the second switch means is in a first state.
10. The invention of claim 5 wherein the means for selecting the Auto or first Manual Reprint mode will not select either mode if the neghold status signal indicates that a neghold of the first set is being used.

* * * * *